(12) United States Patent
Ouyang et al.

(10) Patent No.: US 9,621,230 B2
(45) Date of Patent: Apr. 11, 2017

(54) ELECTRONIC DEVICE WITH NEAR-FIELD ANTENNAS

(71) Applicant: Apple Inc., Cupertino, CA (US)

(72) Inventors: Yuehui Ouyang, Sunnyvale, CA (US); Joseph Hakim, Cupertino, CA (US); Dean F. Darnell, Durham, NC (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/195,247

(22) Filed: Mar. 3, 2014

(65) Prior Publication Data

US 2015/0249485 A1 Sep. 3, 2015

(51) Int. Cl.
*H04B 5/00* (2006.01)
*H04B 5/02* (2006.01)
(Continued)

(52) U.S. Cl.
CPC ............ *H04B 5/0081* (2013.01); *H01Q 5/35* (2015.01); *H01Q 7/00* (2013.01); *H01Q 9/42* (2013.01);
(Continued)

(58) Field of Classification Search
CPC  H01Q 1/243; H01Q 5/35; H01Q 7/00; H01Q 9/0421; H01Q 9/42; H04B 5/0081; H04B 5/02; H04W 88/06
See application file for complete search history.

(56) References Cited

U.S. PATENT DOCUMENTS

| 5,936,583 A | 8/1999 | Sekine et al. |
| 6,308,051 B1 | 10/2001 | Atokawa |
(Continued)

FOREIGN PATENT DOCUMENTS

| EP | 2498336 | 9/2012 |
| EP | 2528165 | 11/2012 |
(Continued)

OTHER PUBLICATIONS

Irci et al., U.S. Appl. No. 14/262,486, filed Apr. 25, 2014.
(Continued)

*Primary Examiner* — Lewis West
(74) *Attorney, Agent, or Firm* — Treyz Law Group, P.C.; G. Victor Treyz; Michael H. Lyons

(57) ABSTRACT

An electronic device may have multiple near-field communications antennas. Multiplexer circuitry may have a transceiver port that is coupled to a near-field communications transceiver, and multiple antenna ports coupled to respective near-field communications antennas. Non-near-field communications antennas may be used by non-near-field communications circuitry. The electronic device may have a housing with opposing first and second ends and a display. One of the near-field communications antennas and one of the non-near-field communications antenna may be formed from shared antenna structures at the first end. Another of the near-field communications antennas and another of the non-near-field communications antennas may be formed from shared antenna structures at the second end. An additional near field communications antenna may be overlapped by the display.

20 Claims, 8 Drawing Sheets

(51) Int. Cl.
  *H01Q 9/42* (2006.01)
  *H01Q 7/00* (2006.01)
  *H01Q 1/24* (2006.01)
  *H01Q 9/04* (2006.01)
  *H04W 88/06* (2009.01)
  *H01Q 5/35* (2015.01)

(52) U.S. Cl.
  CPC ............... *H04B 5/02* (2013.01); *H01Q 1/243* (2013.01); *H01Q 9/0421* (2013.01); *H04W 88/06* (2013.01)

(56) References Cited

U.S. PATENT DOCUMENTS

| | | |
|---|---|---|
| 6,556,630 B1 | 4/2003 | Brinsfield et al. |
| 6,600,450 B1 | 7/2003 | Efanov et al. |
| 6,950,410 B1 | 9/2005 | Brandt |
| 7,408,515 B2 | 8/2008 | Leisten |
| 7,423,606 B2 | 9/2008 | Knadle, Jr. et al. |
| 7,450,072 B2 | 11/2008 | Kim et al. |
| 7,505,001 B2 | 3/2009 | Deavours et al. |
| 7,541,930 B2 * | 6/2009 | Saarisalo ............ G06K 7/0008 340/10.1 |
| 7,772,941 B2 | 8/2010 | Yeung et al. |
| 7,834,813 B2 | 11/2010 | Caimi et al. |
| 7,843,347 B2 | 11/2010 | Nikitin et al. |
| 7,873,385 B2 | 1/2011 | Boireau et al. |
| 7,973,722 B1 | 7/2011 | Hill et al. |
| 8,041,227 B2 | 10/2011 | Holcombe et al. |
| 8,238,825 B2 | 8/2012 | Rofougaran et al. |
| 8,369,959 B2 | 2/2013 | Meskens |
| 8,417,296 B2 | 4/2013 | Caballero et al. |
| 8,432,322 B2 | 4/2013 | Amm et al. |
| 8,466,839 B2 | 6/2013 | Schlub et al. |
| 8,483,751 B2 * | 7/2013 | Black ................. H01Q 1/243 343/702 |
| 8,577,289 B2 | 11/2013 | Schlub et al. |
| 8,606,215 B2 | 12/2013 | Sharma |
| 8,666,445 B2 * | 3/2014 | Chang ................. H04B 7/0608 455/13.3 |
| 8,699,965 B2 * | 4/2014 | Duron ................... H01P 1/10 455/107 |
| 8,818,450 B2 | 8/2014 | Caballero et al. |
| 8,947,305 B2 | 2/2015 | Amm et al. |
| 9,325,080 B2 * | 4/2016 | Ouyang ............... H01Q 21/30 |
| 2006/0055618 A1 | 3/2006 | Poilasne et al. |
| 2007/0279287 A1 | 12/2007 | Castaneda et al. |
| 2008/0081631 A1 * | 4/2008 | Rofougaran ............ H01Q 1/38 455/452.1 |
| 2008/0182512 A1 * | 7/2008 | Waters .................. H04B 5/00 455/41.1 |
| 2009/0058735 A1 | 3/2009 | Hill et al. |
| 2009/0073070 A1 * | 3/2009 | Rofougaran ......... H04B 5/0012 343/793 |
| 2009/0143028 A1 | 6/2009 | Kim |
| 2009/0153303 A1 * | 6/2009 | Forster ............... G06K 19/0724 340/10.1 |
| 2009/0180451 A1 | 7/2009 | Alpert et al. |
| 2010/0007568 A1 | 1/2010 | Fear et al. |
| 2010/0222010 A1 | 9/2010 | Ozaki et al. |
| 2010/0279734 A1 | 11/2010 | Karkinen et al. |
| 2011/0148733 A1 | 6/2011 | Fahs et al. |
| 2011/0241949 A1 | 10/2011 | Nickel et al. |
| 2011/0243120 A1 | 10/2011 | Ginsburg et al. |
| 2012/0135681 A1 | 5/2012 | Adams et al. |
| 2012/0258660 A1 * | 10/2012 | Rajendran ................ H01Q 7/00 455/41.1 |
| 2012/0299785 A1 | 11/2012 | Bevelacqua |
| 2013/0002511 A1 | 1/2013 | Higaki et al. |
| 2013/0017867 A1 | 1/2013 | Lee et al. |
| 2013/0057446 A1 | 3/2013 | Hirobe et al. |
| 2013/0109433 A1 | 5/2013 | Wang et al. |
| 2013/0189923 A1 | 7/2013 | Lewin |
| 2013/0194139 A1 | 8/2013 | Nickel et al. |
| 2013/0196711 A1 * | 8/2013 | Behin ...................... H04B 5/02 455/553.1 |
| 2013/0217342 A1 | 8/2013 | Abdul-Gaffoor et al. |
| 2013/0231046 A1 | 9/2013 | Pope et al. |
| 2013/0241796 A1 | 9/2013 | Nagumo |
| 2013/0300618 A1 | 11/2013 | Yarga et al. |
| 2014/0045442 A1 | 2/2014 | Caruana et al. |
| 2014/0062812 A1 | 3/2014 | Smith et al. |
| 2014/0128032 A1 | 5/2014 | Muthukumar |
| 2014/0139380 A1 * | 5/2014 | Ouyang .................. H01Q 7/00 343/702 |
| 2014/0306857 A1 * | 10/2014 | Bevelacqua ........... H01Q 1/243 343/750 |
| 2014/0315592 A1 | 10/2014 | Schlub et al. |
| 2014/0328488 A1 | 11/2014 | Caballero et al. |
| 2015/0249292 A1 | 9/2015 | Ouyang et al. |
| 2015/0249485 A1 | 9/2015 | Ouyang et al. |

FOREIGN PATENT DOCUMENTS

| | | |
|---|---|---|
| EP | 2618497 | 7/2013 |
| KR | 10-2012-0084770 | 7/2012 |
| KR | 10-2012-0102516 | 9/2012 |
| KR | 10-2012-0103297 A | 9/2012 |
| TW | 201240379 | 10/2012 |
| WO | 2012127097 | 9/2012 |
| WO | 2013147823 | 10/2013 |

OTHER PUBLICATIONS

Yarga et al., U.S. Appl. No. 14/254,604, filed Apr. 16, 2014.
Balanis, "Antenna Theory: A Review", Proceedings of the IEEE, vol. 80, No. 1, Jan. 1992.

* cited by examiner

ELECTRONIC DEVICE WITH NEAR-FIELD ANTENNAS

BACKGROUND

This relates to electronic devices, and more particularly, to antennas for electronic devices with wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands. Electronic devices may use short-range wireless communications circuitry such as wireless local area network communications circuitry to handle communications with nearby equipment. Electronic devices may also be provided with satellite navigation system receivers and other wireless circuitry such as near-field communications circuitry. Near-field communications schemes involve electromagnetically coupled communications over short distances, typically 20 cm or less.

To satisfy consumer demand for small form factor wireless devices, manufacturers are continually striving to implement wireless communications circuitry such as antenna components using compact structures. At the same time, there is a desire for wireless devices to cover a growing number of communications bands. For example, it may be desirable for a wireless device to cover a near-field communications band while simultaneously covering additional non-near-field (far field) bands such cellular telephone bands, wireless local area network bands, and satellite navigation system bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies.

It would therefore be desirable to be able to provide improved wireless communications circuitry for wireless electronic devices.

SUMMARY

An electronic device may have near-field communications antennas. Multiplexer circuitry may be provided that has a transceiver port coupled to a near-field communications transceiver and that has multiple antenna ports coupled to respective near-field communications antennas. The electronic device may have non-near-field communications antennas that are used by a non-near-field communications transceiver. Multiplexing circuitry may be provided that has antenna ports coupled respectively to each of the non-near-field communications antennas and that has a transceiver port coupled to non-near-field communications transceiver.

The electronic device may have a housing with opposing first and second ends. A display may be mounted between the first and second ends. One of the near-field communications antennas and one of the non-near-field communications antenna may be formed from shared antenna structures at the first end. Another of the near-field communications antennas and another of the non-near-field communications antennas may be formed from shared antenna structures at the second end. Baluns may be used in coupling near-field communications transceiver circuitry to the near-field communications antennas. An additional near field communications antenna may be coupled to one of the antenna ports in the multiplexing circuitry for the near-field communications circuitry and may be overlapped by the display.

DETAILED DESCRIPTION

Electronic devices may be provided with wireless circuitry. The wireless circuitry may include near-field communications circuitry. For example, a near-field communications transmitter-receiver ("transceiver") may use a near-field communications antenna to transmit and receive near-field electromagnetic signals at a frequency such as 13.56 MHz. Near-field communications schemes involve near-field electromagnetic coupling between near-field antennas that are separated by a relatively small distance (e.g., 20 cm or less). The near-field communications antennas may be loop antennas. The wireless circuitry may also include cellular network transceiver circuitry, wireless local area network transceiver circuitry, satellite navigation system circuitry, or other non-near-field communications circuitry. The non-near-field communications circuitry can use an antenna to handle radio-frequency signals at frequencies of 700 MHz to 2700 MHz, 5 GHz, or other suitable frequencies.

To conserve space within an electronic device, a near-field communications antenna and a non-near-field communications antenna can be formed from shared antenna structures. For example, conductive electronic device housing structures, metal traces on printed circuits and other substrates, and other conductive structures in an electronic device may be configured to serve both as a non-near-field antenna and as a near-field antenna. Near-field and non-near-field antennas may also be implemented using separate antennas.

Figure 1:
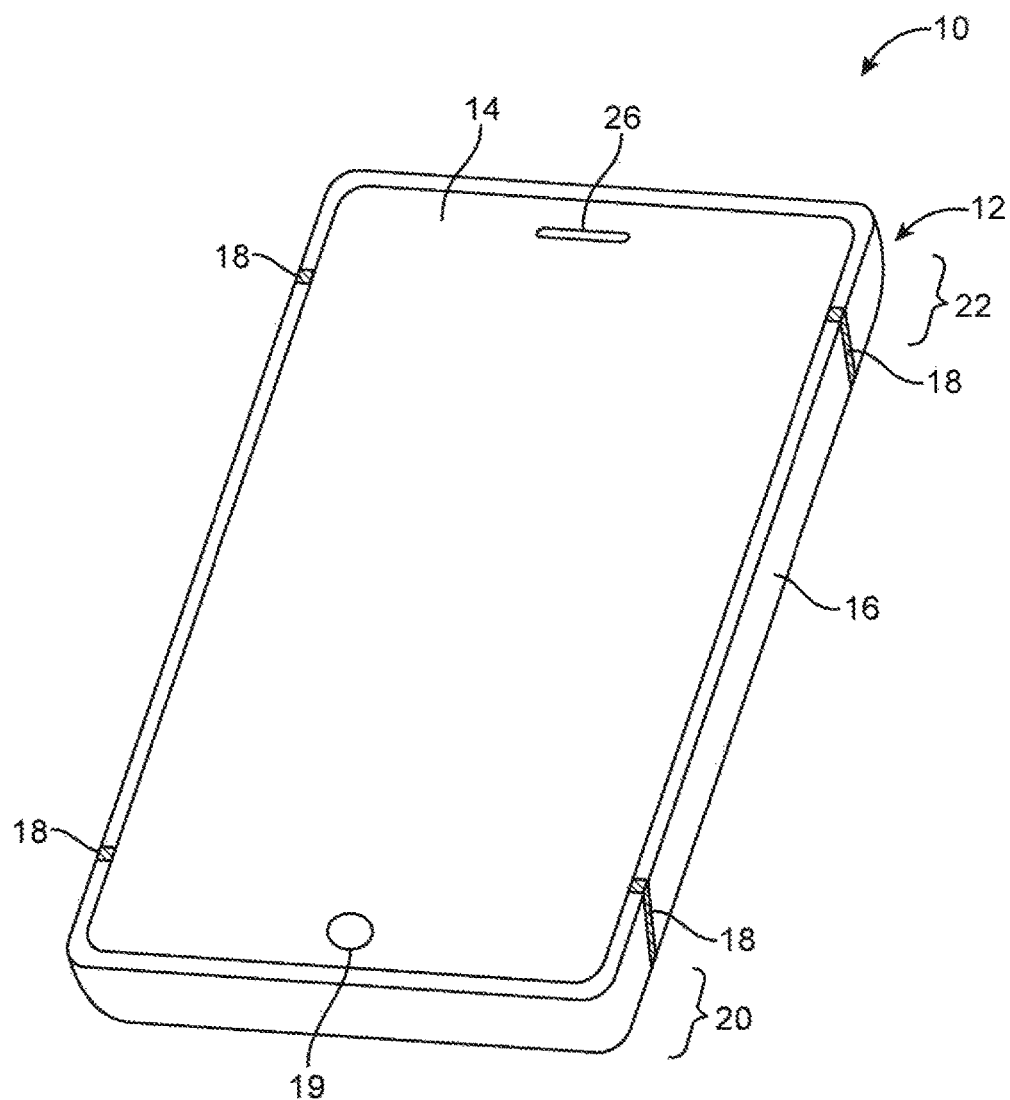
FIG. 1 is a perspective view of an illustrative electronic device with wireless communications circuitry in accordance with an embodiment.

FIG. 1 is a perspective view of an illustrative electronic device of the type that may be provided with wireless communications circuitry having antenna structures for handling near-field communications and non-near-field communications. The wireless communications circuitry may be used to support wireless communications in multiple wireless communications bands. The wireless communications circuitry may include antenna structures that include loop antennas, inverted-F antennas, strip antennas, planar inverted-F antennas, slot antennas, hybrid antennas that include antenna structures of more than one type, or other suitable antennas.

Antenna structures may, if desired, be formed from conductive electronic device structures. The conductive electronic device structures may include conductive housing structures. The housing structures may include a peripheral conductive member or other conductive peripheral electronic device housing structures running around the periphery of an electronic device. The peripheral conductive housing structures may serve as a bezel for a planar structure such as a display and/or may form vertical sidewalls for the device.

If desired, antenna structures may be configured to handle both near-field communications (e.g., communications in a near-field communications band such as a 13.56 MHz band or other near-field communications band) and non-near-field communications (sometimes referred to as far field communications) such as cellular telephone communications, wireless local area network communications, and satellite navigation system communications. Near-field communications typically involve communication distances of less than about 20 cm and involve magnetic (electromagnetic) near-field coupling between near-field antennas such as loop antennas. Far field communications typically involved communication distances of multiple meters or miles.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, or a media player. Device 10 may also be a television, a set-top box, a desktop computer, a computer monitor into which a computer has been integrated, a television, a computer monitor, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electrowetting pixels, electrophoretic pixels, liquid crystal display (LCD) components, or other suitable image pixel structures. A display cover layer such as a cover glass layer or a layer of clear plastic may cover the surface of display 14. Buttons such as button 19 may pass through openings in the display cover layer or other outer layer in display 14. The cover glass may also have other openings such as an opening for speaker port 26.

Housing 12 may include peripheral conductive housing structures 16 such as a metal member or other conductive member. Peripheral conductive housing structures 16 may run around the periphery of device 10 and display 14. In configurations in which device 10 and display 14 have rectangular shapes, peripheral conductive housing structures 16 may have a rectangular ring shape (as an example). Peripheral conductive housing structures 16 or part of peripheral conductive housing structures 16 may serve as a bezel for display 14 (e.g., a cosmetic trim that surrounds all four sides of display 14 and/or helps hold display 14 to device 10). Peripheral conductive housing structures 16 may also, if desired, form sidewall structures for device 10 (e.g., by forming a band with vertical sidewalls, by forming a band with rounded sidewalls, etc.). If desired, peripheral conductive housing structures 16 such as housing sidewalls may be formed as integral portions of a metal rear housing wall for device 10 (i.e., the rear surface and edges of housing 12 may be formed from a conductive material such as metal).

Peripheral conductive housing structures 16 may include a peripheral conductive member such as a peripheral metal member, a peripheral metal housing band, or other peripheral conductive housing member, may include a metal display bezel, may include metal housing sidewalls, or may include other peripheral conductive housing structures. Peripheral conductive housing structures 16 (e.g., a metal member) may be formed from a metal such as stainless steel, aluminum, or other suitable materials. One, two, three, or more than three separate structures may be used in forming a peripheral conductive housing member or metal sidewalls may be separated into one, two, three, or more than three sidewall segments.

It is not necessary for peripheral conductive housing structures 16 to have a uniform cross-section. For example, the top (front face) portion of peripheral conductive housing structures 16 may, if desired, have an inwardly protruding lip that helps hold display 14 in place. If desired, the bottom portion of peripheral conductive housing structures 16 may also have an enlarged lip (e.g., in the plane of the rear surface of device 10). In the example of FIG. 1, structures 16 have substantially straight vertical sidewalls. This is merely illustrative. Sidewalls in housing 12 may be curved or may have any other suitable shape. In some configurations (e.g., when structures 16 serve as a bezel for display 14), structures 16 may run around the lip of housing 12 (i.e., structures 16 may cover only the edge of housing 12 that surrounds display 14 and not the rear edge of housing 12 of the sidewalls of housing 12).

Display 14 may include conductive structures such as an array of capacitive touch sensor electrodes, conductive lines for addressing display pixel elements, driver circuits, etc. Housing 12 may include internal structures such as metal frame members, a planar sheet metal housing structure (sometimes referred to as a midplate) that spans the walls of housing 12 (i.e., a substantially rectangular member that is welded or otherwise connected between opposing sides of structures 16), printed circuit boards, and other internal conductive structures. These conductive structures may be located in the center of housing 12 under display 14 (as an example).

In regions 22 and 20, openings (gaps) may be formed within the conductive structures of device 10 (e.g., between peripheral conductive housing structures 16 or other conductive structures at the upper and lower edges of device 10 and opposing conductive structures that may form an antenna ground such as conductive housing structures, a conductive ground plane associated with a printed circuit board, and conductive electrical components in device 10). These openings may be filled with air, plastic, and other dielectrics. Conductive housing structures and other conductive structures in device 10 may serve as a ground plane for antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element arm from the ground plane, or may otherwise serve as part of antenna structures formed in regions 20 and 22. If desired, one or more near-field communications antennas or other antennas may be located under display 14 between regions 20 and 22.

In general, device 10 may include any suitable number of antennas (e.g., one or more, two or more, three or more, four or more, etc.). The antennas in device 10 may be located at opposing first and second ends of an elongated device housing, along one or more edges of a device housing, in the center of a device housing, in other suitable locations, or in one or more of such locations.

Portions of peripheral conductive housing structures 16 may be provided with gap structures. For example, peripheral conductive housing structures 16 may be provided with one or more gaps such as gaps 18, as shown in FIG. 1. The gaps may be filled with dielectric such as polymer, ceramic, glass, air, other dielectric materials, or combinations of these materials. Gaps 18 may divide peripheral conductive housing structures 16 into one or more peripheral conductive housing structure (member) segments. There may be, for example, two segments of a peripheral conductive housing member or other peripheral conductive housing structures 16 (e.g., in an arrangement with two gaps), three segments (e.g., in an arrangement with three gaps), four segments (e.g., in an arrangement with four gaps, etc.). The segments of the peripheral conductive housing member or other peripheral conductive housing structures that are formed in this way may form parts of antennas in device 10.

If desired, device 10 may have upper and lower antennas and a middle (central) antenna that is located between the upper and lower antennas (as an example). An upper antenna may, for example, be formed at the upper end of device 10 in region 22. A lower antenna may, for example, be formed at the lower end of device 10 in region 20. The middle antenna may be located between regions 20 and 22 and may overlapped by display 14. The antennas may be used separately to cover identical communications bands, overlapping communications bands, or separate communications bands. The antennas may be used to implement an antenna diversity scheme or a multiple-input-multiple-output (MIMO) antenna scheme.

If desired, antenna structures may be shared between near-field and non-near-field communications. As an example, antenna structures in region 22 may be configured to serve both as a non-near-field antenna such as an inverted-F antenna that handles non-near-field communications and as a near-field antenna such as a loop antenna that handles near-field communications. The antenna structures in region 20 may be configured to serve both as a non-near-field antenna such as an inverted-F antenna that handles non-near-field communications and as a near-field antenna such as a loop antenna that handles near-field communications. The antenna structures in the region between regions 20 and 22 may be configured to serve as a near-field antenna such as a loop antenna that handles near-field communications without handling non-near-field communications (as an example).

Antennas in device 10 may be used to support any communications bands of interest. For example, device 10 may use non-near-field antennas to handle non-near-field-communications such as local area network communications, voice and data cellular telephone communications, global positioning system (GPS) communications or other satellite navigation system communications, Bluetooth® communications, etc. Device 10 may use near-field communications antennas to handle near-field communications (e.g., communications at 13.56 MHz).

Figure 2:
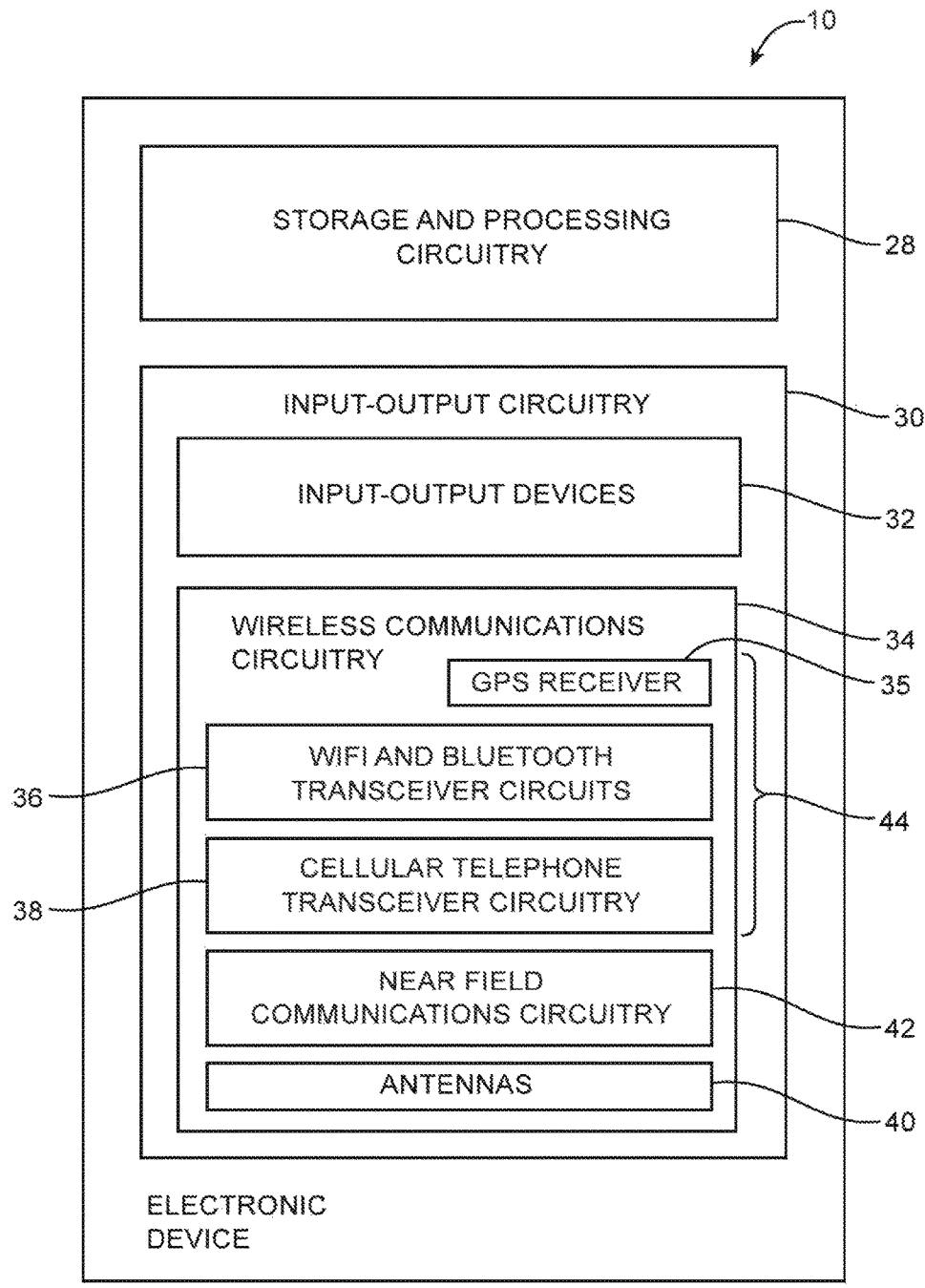
FIG. 2 is a schematic diagram of an illustrative electronic device with wireless communications circuitry in accordance with an embodiment.

A schematic diagram of an illustrative configuration that may be used for electronic device 10 is shown in FIG. 2. As shown in FIG. 2, electronic device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. The processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, near-field communications protocols, etc.

Circuitry 28 may be configured to implement control algorithms that control the use of antennas in device 10. For example, circuitry 28 may perform signal quality monitoring operations, sensor monitoring operations, and other data gathering operations and may, in response to the gathered data and information on which communications bands are to be used in device 10, control which antenna structures within device 10 are being used to receive and process data and/or may adjust one or more switches, tunable elements, or other adjustable circuits in device 10 to adjust antenna performance. As an example, circuitry 28 may control which of two or more antennas is being used to receive or transmit near-field or non-near-field wireless signals, which antenna is being used to handle incoming radio-frequency signals, may control which of two or more antennas is being used to transmit radio-frequency signals, may control the process of routing incoming data streams over two or more antennas in device 10 in parallel, may tune an antenna to cover a desired communications band, may perform time-division multiplexing operations to share antenna structures between near-field and non-near-field communications circuitry, to share a non-near-field communications transceiver between multiple non-near-field antennas, to share a near-field communications transceiver between multiple near-field antennas, etc.

In performing these control operations, circuitry 28 may open and close switches (e.g., switches associated with one or more multiplexers or other switching circuitry), may turn on and off receivers and transmitters, may adjust impedance matching circuits, may configure switches in front-end-module (FEM) radio-frequency circuits that are interposed between radio-frequency transceiver circuitry and antenna structures (e.g., filtering and switching circuits used for impedance matching and signal routing), may adjust switches, tunable circuits, and other adjustable circuit elements that are formed as part of an antenna or that are coupled to an antenna or a signal path associated with an antenna, and may otherwise control and adjust the components of device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32. The sensors in input-output circuitry 30 may gather information about the operating environment of device 10 and/or user input and may include sensors such as a touch sensor, an accelerometer, a compass, a proximity sensor, an ambient light sensor, and other sensors. Sensor data may be used in controlling antenna operation (e.g., in switching between antennas, tuning antennas, etc.).

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 35 (e.g., for receiving satellite positioning signals at 1575 MHz) or satellite navigation system receiver circuitry associated with other satellite navigation systems.

Wireless local area network transceiver circuitry 36 in wireless communications circuitry 34 may handle 2.4 GHz and 5 GHz bands for WiFi® (IEEE 802.11) communications and may handle the 2.4 GHz Bluetooth® communications band.

Circuitry 34 may use cellular telephone transceiver circuitry 38 for handling wireless communications in cellular telephone bands such as bands in frequency ranges of about 700 MHz to about 2700 MHz or bands at higher or lower frequencies.

Wireless communications circuitry 34 may include near-field communications circuitry 42. Near-field communications circuitry 42 may handle near-field communications at frequencies such as the near-field communications frequency of 13.56 MHz or other near-field communications frequencies of interest.

Circuitry 44 such as satellite navigation system receiver circuitry 35, wireless local area network transceiver circuitry 36, and cellular telephone transceiver circuitry 38 that does not involve near-field communications may sometimes be referred to as non-near-field communications circuitry or far field communications circuitry.

Antenna structures 40 may be shared by non-near-field communications circuitry 44 and near-field communications circuitry 42 and/or may include one or more separate near-field and non-near-field antennas.

If desired, communications circuitry 34 may include circuitry for other short-range and long-range wireless links. For example, wireless communications circuitry 34 may include wireless circuitry for receiving radio and television signals, paging circuits, etc. In near-field communications, wireless signals are typically conveyed over distances of less than 20 cm. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antenna structures 40. Antenna structures 40 may include one or more antennas. Antennas structures 40 may be formed using any suitable antenna types. For example, antenna structures 40 may include antennas with resonating elements that are formed from loop antenna structures, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link.

To accommodate near-field communications within the potentially tight confines of device housing 12, antenna structures 40 may be shared between non-near-field communications circuitry 44 and near-field communications circuitry 42. When, for example, it is desired to transmit and receive cellular telephone signals or other non-near-field communications, antenna structures 40 may be used by cellular telephone transceiver circuitry 38 or other non-near-field transceiver circuitry 44. When it is desired to transmit and receive near-field communications signals, antenna structures 40 may be used by near-field communications circuitry 42. Separate near-field communications antennas and non-near-field communications antennas may also be used in device 10, if desired.

Figure 3:
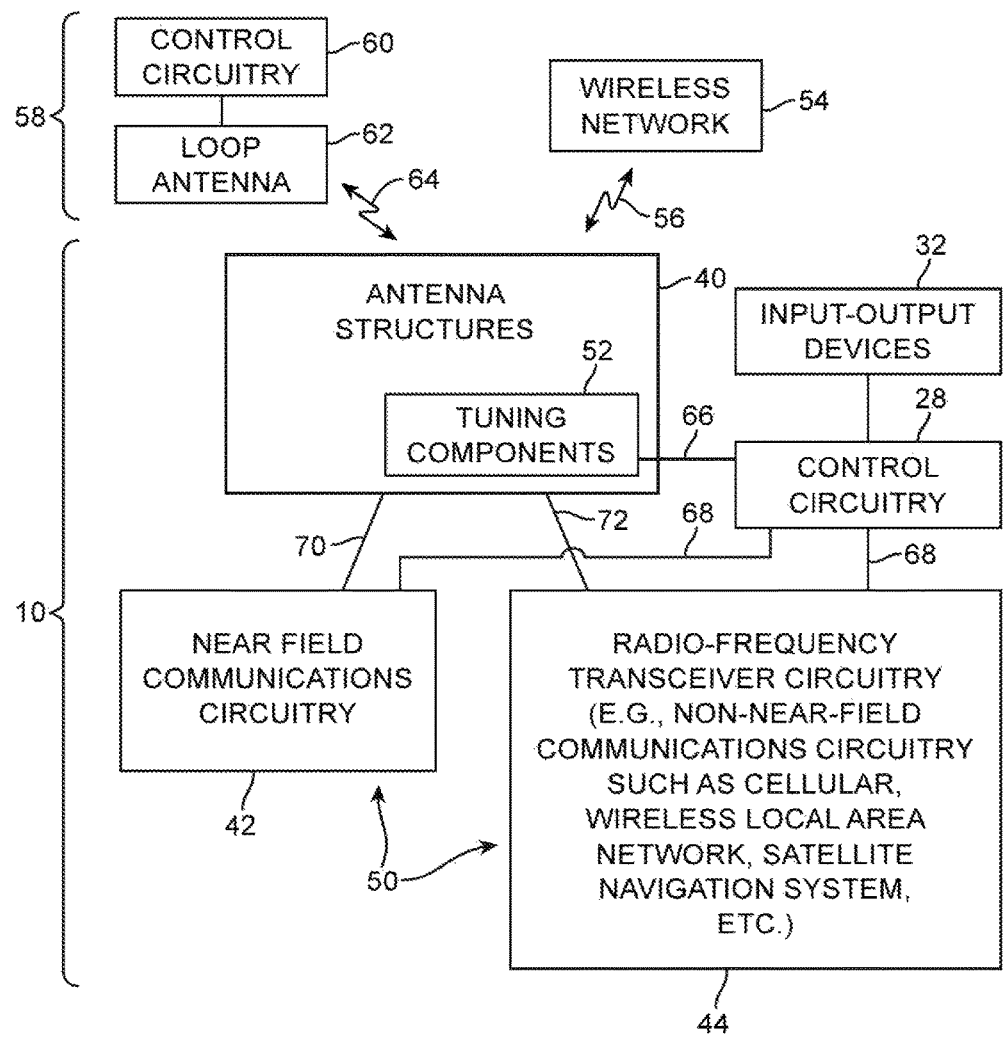
FIG. 3 is a diagram of a system in which antenna structures in an electronic device are being used to wirelessly communicate with external electrical equipment using near-field communications and non-near-field communications in accordance with an embodiment.

FIG. 3 is a schematic diagram showing how antenna structures 40 in device 10 may be used by near-field communications circuitry 42 and non-near-field communications circuitry 44. As shown in FIG. 3, electronic device 10 includes control circuitry 28 and input-output devices 32. Control circuitry 28 may use input-output devices 32 to provide output to a user and to receive input. Control circuitry 28 may use wireless transceiver circuitry 50 and antenna structures 40 to communicate with external equipment over one or more wireless communications bands including bands for non-near-field communications and near-field communications. Antenna structures 40 may include one or more near-field-communications antennas, one or more non-near-field communications antennas, one or more antenna arrays or other sets of multiple antennas such as a near-field antenna array having multiple near-field antennas and/or a non-near-field antenna array having multiple non-near-field antennas, etc. If desired, some of antenna structures 40 may be shared between near-field and non-near-field communications. Antenna structures 40 may also contain near-field antennas that do not handle any non-near-field antennas (i.e., antennas that are exclusively used for handling near-field communications) and/or non-near-field antennas that do not handle any near-field communications (i.e., antennas that are exclusively used for handling non-near-field communications).

Near-field communications circuitry 42 and non-near-field communications circuitry 44 may be coupled to antenna structures 40. Near-field communications circuitry 42 (e.g., a near-field communications transceiver) may use antenna structures 40 to communicate with external near-field communications equipment 58 over near-field communications link 64. Non-near-field communications circuitry such as radio-frequency transceiver circuitry 44 may use antenna structures 40 to communicate with a cellular telephone network, a wireless local area network, or other far field (non-near-field) wireless network equipment 54 over non-near-field communications wireless link 56.

External equipment such as external equipment 58 may communicate with near-field communications circuitry 42 via magnetic induction. Equipment 58 may include a loop antenna such as loop antenna 62 that is controlled by control circuitry 60. Loop antenna 62 and one or more loop antennas in antenna structures 40 may be electromagnetically coupled to support near-field wireless communications when loop antenna 62 and the loop antenna(s) in structures 40 are within an appropriately close distance of each other such as 20 cm or less, as indicated by near-field communications signals 64 of FIG. 3.

Device 10 may use near-field communications circuitry 42 and antenna structures 40 (e.g., the near-field communications loop antenna(s) of antenna structures 40) to communicate with external near-field communications equipment 58 using passive or active communications. In passive communications, device 10 may use near-field communications circuitry 42 and antenna structures 40 to modulate electromagnetic signals 64 from equipment 58. In active communications, near-field communications circuitry 42 and antenna structures 40 may transmit radio-frequency electromagnetic signals 64 to external equipment 58.

To provide antenna structures 40 with the ability to cover communications frequencies of interest, antenna structures 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna).

If desired, antenna structures 40 may be provided with adjustable circuits such as tunable circuitry 52. Tunable circuitry 52 may be controlled by control signals from control circuitry 28. For example, control circuitry 28 may supply control signals to tunable circuitry 52 via control path 66 during operation of device 10 whenever it is desired to tune antenna structures 40 to cover a desired communications band (e.g., a desired non-near-field communications band). Paths 68 may be used to convey data between control circuitry 28 and transceiver circuitry 50.

Passive filter circuitry in antenna structures 40 may help antenna structures 40 exhibit antenna resonances in communications bands of interest (e.g., passive filter circuitry in antenna structures 40 may short together different portions of antenna structures 40 and/or may form open circuits or pathways of other impedances between different portions of antenna structures 40 to ensure that desired antenna resonances are produced).

Transceiver circuitry 50 may be coupled to antenna structures 40 by signal paths such as signal paths 70 and 72. Signal paths 70 and 72 may include transmission lines, portions of conductive housing structures, ground plane structures, traces on printed circuits, or other conductive paths. If desired, circuitry such as switching circuitry or passive combiner circuitry may be interposed in paths such as paths 70 and 72 to allow transceivers to be shared among multiple antennas.

Impedance matching circuitry formed from components such as inductors, resistors, and capacitors may be used in matching the impedance of antenna structures 40 to the impedance of transmission line structures coupled to antenna structures 40. Filter circuitry may also be provided in the transmission line structures and/or antenna structures 40. Matching network components may be provided as discrete components (e.g., surface mount technology components) or may be formed from housing structures, printed circuit board structures, traces on plastic supports, etc. Components such as these may also be used in forming passive filter circuitry in antenna structures 40 and tunable circuitry 52 in antenna structures 40.

A transmission line may be coupled between transceiver 44 and antenna feed structures associated with antenna structures 40. As an example, antenna structures 40 may form one or more non-near-field communications antennas such as one or more inverted-F antennas each having an antenna feed with a positive antenna feed terminal and a ground antenna feed terminal. For each antenna, a positive transmission line conductor may be coupled to the positive antenna feed terminal and a ground transmission line conductor may be coupled to the ground antenna feed terminal. Other types of antenna feed arrangements may be used to couple non-near-field communications transceiver 44 to non-near-field antennas in antenna structures 40 if desired.

Near-field communications circuitry 42 may be coupled to near-field communications antennas using switching circuitry or passive signal combining circuitry. This allows a near-field communications transceiver integrated circuit to be shared between multiple antennas. If desired, a balun may be interposed between near-field communications circuitry 42 and a near-field communications antenna in antenna structures 40. Near-field communications circuitry 42 may have a differential output. The balun may convert differential output (signals referenced to each other) from circuitry 42 to single-ended signals (signals referenced to ground) for feeding the near-field communications antenna formed from antenna structures 40.

Tunable circuitry 52 may be formed from one or more tunable circuits such as circuits based on capacitors, resistors, inductors, and switches. Tunable circuitry 52 and filter circuitry in antenna structures 40 may be implemented using discrete components mounted to a printed circuit such as a rigid printed circuit board (e.g., a printed circuit board formed from glass-filled epoxy) or a flexible printed circuit formed from a sheet of polyimide or a layer of other flexible polymer, a plastic carrier, a glass carrier, a ceramic carrier, or other dielectric substrate. During operation of device 10, control circuitry 28 may issue commands on path 66 to adjust switches, variable components, and other adjustable circuitry in tunable circuitry 52, thereby tuning antenna structures 40. If desired, tunable circuitry 52 may include one or more inductors. A switch circuit may be used to selectively switch a desired number of the inductors into use.

By varying the inductance of tunable circuitry 52 in this way, antenna structures 40 can be tuned to cover desired communications bands. Tunable circuitry 52 may also include one or more capacitors that are selectively switched into use with a switching circuit to tune antenna structures 40. Capacitance adjustments and inductance adjustments may be made using a tunable circuit with adjustable capacitors and inductors and/or separately adjustable capacitor circuits and inductor circuits may be used in tuning antenna structures 40.

Figure 4:
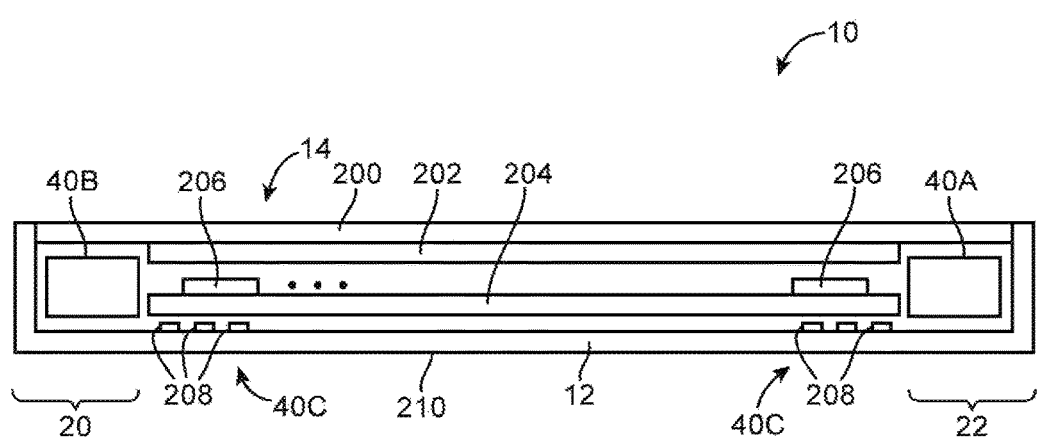
FIG. 4 is a cross-sectional side view of an illustrative electronic device with antenna structures in accordance with an embodiment.

A cross-sectional side view of an illustrative electronic device such as electronic device 10 of FIG. 1 taken lengthwise and viewed from the right-hand side of device 10 is shown in FIG. 4. As shown in FIG. 4, display 14 may include a display module such as display module 202 mounted under display cover layer 200. Display module 202 contains an array of display pixels that display images for a user. The size of the array of display pixels defines the active area of display 14. Display cover layer 200 may be a layer of clear glass or plastic. Display module 202 may be based on liquid crystal display components, may be an array of organic light-emitting diodes, or may be based on other suitable display technology. If desired, a touch sensor may be incorporated into module 202 or other portion of display 14.

Housing 12 may contain dielectric structures and/or conductive structures. For example, housing 12 may, if desired, include peripheral conductive housing structures such as peripheral structures 16 of FIG. 1. Rear surface 210 of housing 12 may be formed from metal or dielectric. With one suitable arrangement, some or all of rear surface 210 is formed from dielectric so that a near-field communications antenna such as a near-field communications loop antenna may be formed from antenna structures 40C such as one or more loops of metal lines 208 that are overlapped by display 14. Antenna structures 40C may, if desired, be formed from metal traces on the inside surface of a plastic housing structure, on a printed circuit, on a plastic carrier mounted within device 10, or on other dielectric substrates. If desired, a ferromagnetic shielding layer may be interposed between near-field communications antenna 40C and internal device components in device 10 such as components 206 on printed circuit 204. The ferromagnetic shielding layer may prevent near-field communications signals from inducing eddy currents in the conductive structures of device 10 such as printed circuit 204 and components 206, thereby ensuring that near-field communications performance is satisfactory.

Device 10 may have antenna structures 40A in region 22 and antenna structures 40B in region 20. Antenna structures 40A may be used to form a near-field communications antenna for handling wireless near-field communications signals and may be used to form a non-near-field communications antenna for handling wireless non-near-field communications signals (e.g., antenna structures 40A may be shared between circuitry 44 and circuitry 42). Antenna structures 40B may also be used to form a near-field communications antenna for handling wireless near-field communications signals and may be used to form a non-near-field communications antenna for handling wireless non-near-field communications signals (e.g., antenna structures 40B may be shared between circuitry 44 and circuitry 42). Antenna structures 40C may serve exclusively as a near-field communications antenna (as an example). Particularly when near-field communications antennas are implemented in regions 20 and 22 and are not blocked by the presence of overlapping structures such as display 14, near-field communications signals may be transmitted and/or received from both the front surface and the opposing rear surface of device 10. This allows a user of device 10 to use a near-field antenna in structures 40A (or in structures 40B) when either the front (display) surface of device 10 or the opposing rear surface 210 of device 10 faces or is otherwise in the vicinity of external loop antenna 62.

Antenna structures 40A and 40B may be used in forming non-near-field antennas based on inverted-F antenna designs or antenna structures with other designs. An illustrative configuration for electronic device 10 that incorporates inverted-F antenna structures 40 for use as structures 40A in region 22 and/or as structures 40B in region 20 is shown in FIG. 5.

Figure 5:
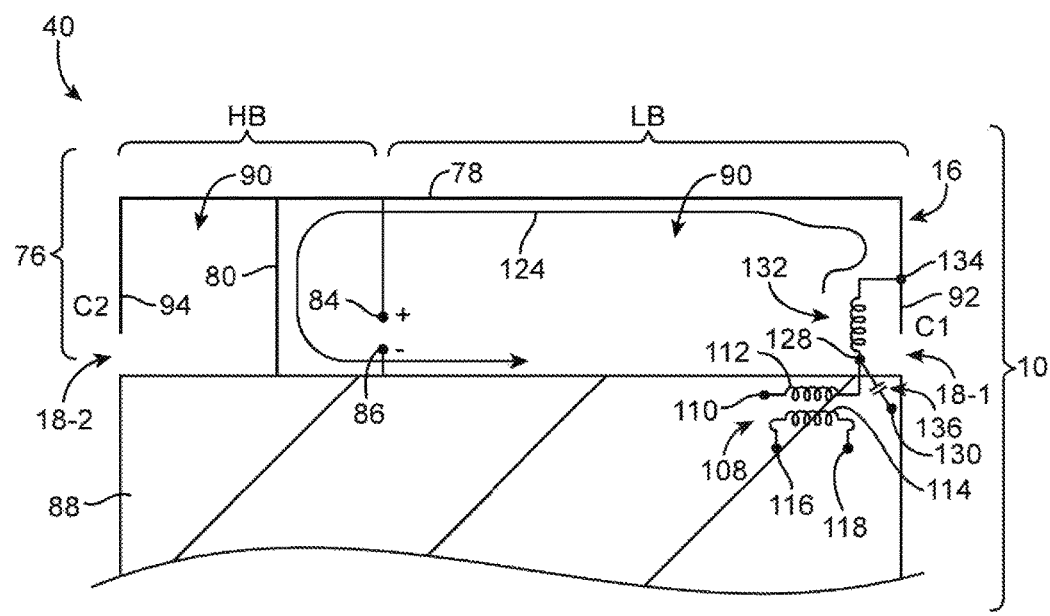
FIG. 5 is a diagram of an electronic device having antenna structures that can be used to handle both non-near-field communications and near-field communications in accordance with an embodiment.

As shown in FIG. 5, antenna structures 40 may include inverted-F antenna resonating element 76 and a conductive structure such as antenna ground 88. Antenna ground 88 may be formed from ground traces on a flexible printed circuit, ground traces on a rigid printed circuit board, metal traces on other dielectric carriers, portions of an electronic device housing such as a metal midplate structure or internal frame structures, conductive structures such as metal portions of electrical components in device 10, or other conductive structures. Inverted-F antenna resonating element 76 may be formed from a segment of peripheral conductive housing structures 16 (e.g., a segment of a metal band or other metal member that surrounds display 14, etc.), other metal housing structures, metal portions of electronic components in device 10, metal traces on printed circuit substrates (e.g., metal traces on a flexible printed circuit having a flexible dielectric substrate or on a rigid printed circuit board), plastic carriers, or other dielectric substrates, or other conductive structures.

Antenna resonating element 76 may include main antenna resonating element arm 78 (e.g., a segment of peripheral conductive housing structures 16 that extends between respective peripheral conductive housing structure gaps such as gaps 18-1 and 18-2 or an arm formed from metal traces on a printed circuit or other dielectric substrate). Main antenna resonating element arm 78 may have one or more branches. For example, arm 78 may have a low band arm LB for producing a low communications band resonance and a high band arm HB for producing a high communications band resonance. Tip portion 94 of high band branch HB may be separated by gap 18-2 from ground plane 88 and may have an associated capacitance C2. Tip portion 92 of low band branch LB may be separated by gap 18-1 from ground plane 88 and may have associated capacitance C1. The size and shapes of the metal structures adjoining gaps 18-1 and 18-2 may be configured to adjust the values of C1 and C2 and thereby adjust antenna performance. If desired, optional inductors may span gaps 18-1 and 18-2 (e.g., to adjust antenna frequency response and/or provide a current path for forming a near-field communications loop antenna).

Arm 78 may be separated from ground plane 88 by a dielectric-filled opening such as gap 90. Gap 90 may contain plastic, glass, ceramic, air, or other dielectric materials. Non-near-field communications antenna return path 80 in the non-near-field communications antenna of antenna structures 40 may bridge gap 90. Non-near-field communications antenna feed path 82 may bridge gap 90 in parallel with return path 80. Antenna feed terminals such as positive antenna feed terminal 84 and ground antenna feed terminal 86 may form a non-near-field communications antenna feed within antenna feed path 82. The conductive structures of antenna return path 80 and antenna feed path 82 may be formed from metal traces on printed circuits, metal traces on plastic carriers, conductive housing structures, or other conductive structures in device 10.

Impedance matching circuitry, filter circuitry, and tuning circuitry 52 of FIG. 3 may be interposed in paths that bridge gap 90 such as path 80, feed path 82, or one or more parallel tuning paths, may bridge gaps such as gaps 18-1 and 18-2 at the tips of main antenna resonating element arm 78 of antenna resonating element 76, may be formed in other portions of antenna resonating element 76 and/or may be incorporated into ground structures such as antenna ground 88.

To support near-field communications in device 10, device 10 preferably includes near-field communications antennas. Space can be conserved by using some or all of antenna structures 40A (and 40B) to form a non-near-field communications antenna such as a cellular telephone antenna and to form a near-field communications antenna. As an example, a near-field communications antenna for device 10 (e.g., an antenna that is used by near-field communications circuitry 42 of FIG. 2 to support communications with external equipment 58 over link 64) may be formed using portions of the antenna structures of FIG. 5 such as portions of antenna resonating element 76 and antenna ground 88 (and other conductive structures that form a loop antenna). By sharing conductive antenna structures between both near-field and non-near-field antennas and by sharing some or all of dielectric opening 90 between both near-field and non-near-field antennas, duplicative conductive structures can be minimized and antenna volume can be conserved within device 10. Antenna structures such as antenna structures 40 of FIG. 5 may be used in forming antenna structures 40A at one end of device 10 and antenna structures such as antenna structures 40 of FIG. 5 may be used in forming antenna structures 40B at an opposing end of device 10 (as an example). With this type of configuration, structures 40A form a near-field communications antenna and a non-near field communications antenna and structures 40B form a near-field communications antenna and a non-near-field communications antenna.

Baluns such as balun 108 may be used in coupling near-field communications circuitry 42 to antenna structures 40. In general, balun 108 may be used to couple communications circuitry 42 to any suitable portion of antenna structures 40 (e.g., an antenna feed path, an antenna return path, portions of arm 78, a separate conductive line that is connected to a return path or other conductive structure in structures 40, etc.). In the illustrative configuration of FIG. 5, balun 108 is coupled to arm 78 of structures 40 using a path containing inductor 132. This is merely illustrative. A balun such as balun 108 may be used to couple near-field communications circuitry 42 to any suitable portion of antenna structures 40 if desired.

As shown in the example of FIG. 5, antenna structures 40 include antenna resonating element 76 and antenna ground 88. Antenna resonating element arm 78 of antenna resonating element 76 is separated from antenna ground 88 by gap 90. Non-near-field communications antenna return path 80 spans gap 90 in parallel with antenna feed path 82. Positive antenna feed terminal 84 and ground antenna feed terminal 86 form a non-near-field communications antenna feed that is coupled to non-near-field communications circuitry 44 (e.g., a non-near-field communications transceiver such as a cellular telephone transceiver, wireless local area network transceiver, etc.). Ground antenna feed terminal 86 is coupled to antenna ground 88.

When it is desired to transmit and/or receive non-near-field communications signals with antenna structures 40, antenna resonating element arm 78, antenna return path 80, antenna feed path 82, and antenna ground 88 (and, if desired, other structures) serve as a non-near-field communications antenna (i.e., an inverted-F antenna) that is used by non-near-field communications circuitry 44.

Near-field communications circuitry 42 (e.g., a near-field communications transceiver operating at 13.56 MHz or other suitable near-field communications frequency) may be coupled to antenna structures 40 using balun 108. Near-field communications circuitry 42 may have a ground terminal that is coupled to antenna ground 88. Near-field communications circuitry 42 may also have a pair of differential signal terminals (sometimes referred to as +V and −V terminals) for handling differential near-field communications signals. The differential signal terminals of near-field communications circuitry 42 may be coupled to respective terminals 116 and 118 of balun 108.

Balun 108 may contain coupled inductors 114 and 112. Inductors 114 and 112 may be coupled by near-field electromagnetic coupling (i.e., inductors 114 and 112 form a transformer and are magnetically coupled). Inductor 114 may have a terminal such as terminal 116 that is coupled to the +V terminal of near-field communications circuit 42 and may have a terminal such as terminal 118 that is coupled to the −V terminal of near-field communications circuit 42. Inductor 112 may have a terminal such as terminal 110 that is coupled to antenna ground 88. Inductor 112 may also have an opposing terminal coupled to node 128. Capacitor 136 or other circuitry for tuning the response of antenna structures 40 may be coupled between node 128 and terminal 130. Terminal 130 may be connected to antenna ground 88. Inductor 132 or other circuitry for tuning the response of antenna structures 40 may be coupled between node 128 and node 134 on antenna resonating element arm 78. Antenna resonating element arm 78 may be formed from a segment of peripheral conductive housing structures 16 or from metal traces on a printed circuit or other support structure. When operated in a near-field communications mode using near-field communications circuitry 42, antenna structures 40 of FIG. 5 form a loop antenna that handles near-field communications signals such as loop current 124. The loop antenna is formed from a loop-shaped signal path that includes balun inductor 112, inductor 132, the segment of arm 78 between node 134 and return path 80, return path 80, and antenna ground 88. In other configurations, the loop antenna may be formed from different loop-shaped paths through antenna structures 40. The configuration of FIG. 5 is merely illustrative.

Figure 6:
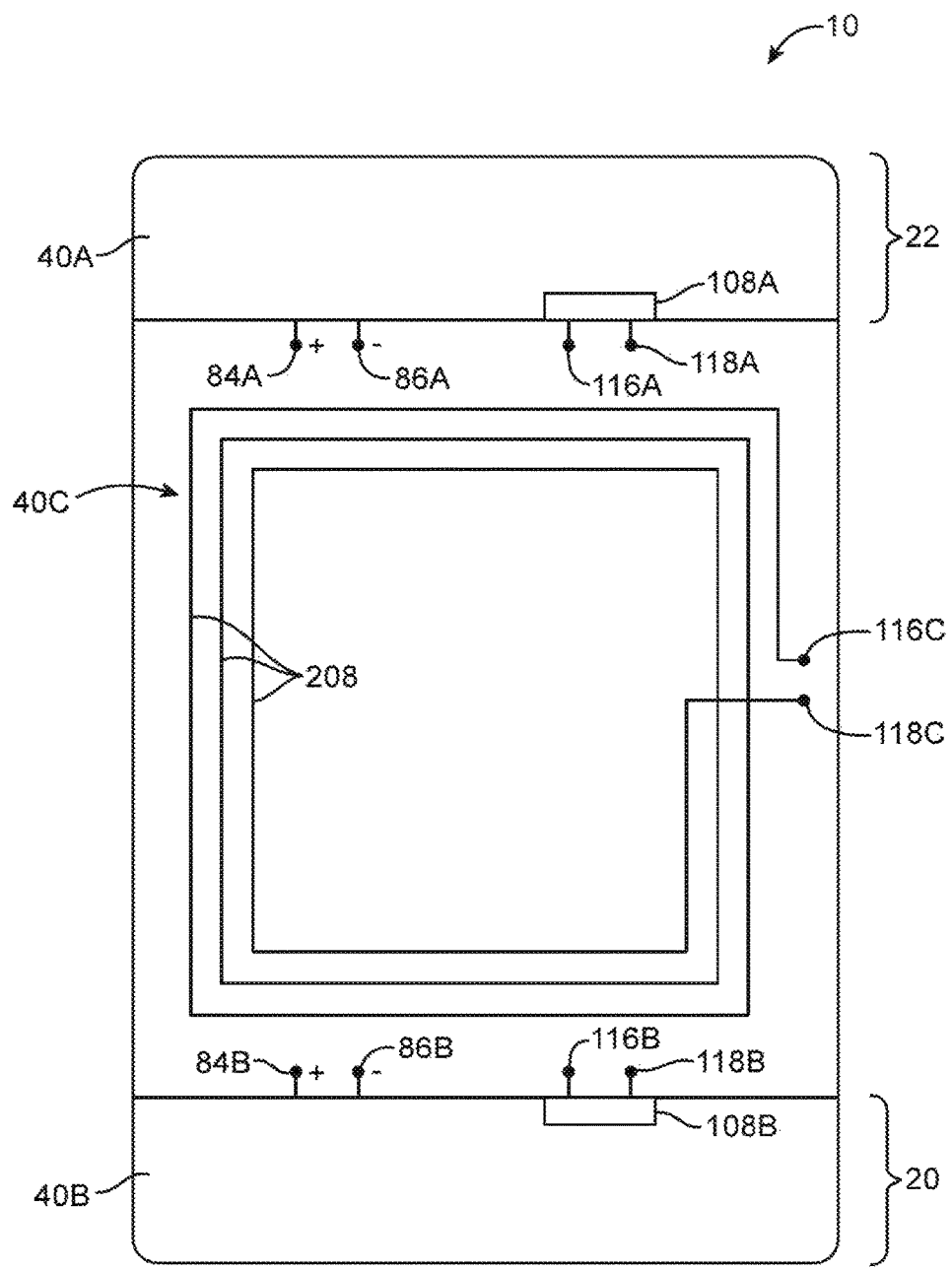
FIG. 6 is top view of an illustrative electronic device having upper antenna structures that may be shared between near-field and non-near-field communications, having lower antenna structures that may be shared between near-field and non-near-field communications, and having a near-field communications antenna that is interposed between the upper and lower antenna structures in accordance with an embodiment.

FIG. 6 is a front view of device 10 showing how antenna structures 40A may be located at upper end region 22 of device 10 and how antenna structures 40B may be located at lower end region 20 of device 10. Antenna structures 40C may form a near-field communications loop antenna in a middle region of device 10 between regions 20 and 22. The loop antenna of structures 40C may be formed from one or more turns of metal signal lines 208. The near-field communications antenna of structures 40C may have near-field communications feed terminals such as terminals 116C and 118C. Terminals 116C and 118C may be coupled to near-field communications transceiver 42 without an intervening balun (as an example). Balun 108A may have near-field communications terminals 116A and 118A for coupling near-field communications transceiver 42 to antenna structures 40A. Balun 108B may have near-field communications terminals 116B and 118B for coupling near-field communications transceiver 42 to antenna structures 40B. Baluns 108A and 108B may be coupled to structures 40A and 40B as described in connection with FIG. 5 or using other coupling arrangements.

Antenna structures 40A and 40B may support both near-field and non-near-field communications. Non-near-field antenna terminals (feed terminals) 84A and 86A may be used to couple non-near-field communications circuitry 44 to antenna structures 40A. Non-near-field antenna terminals (feed terminals) 84B and 86B may be used to couple non-near-field communications circuitry 44 to antenna structures 40B.

Figure 7:
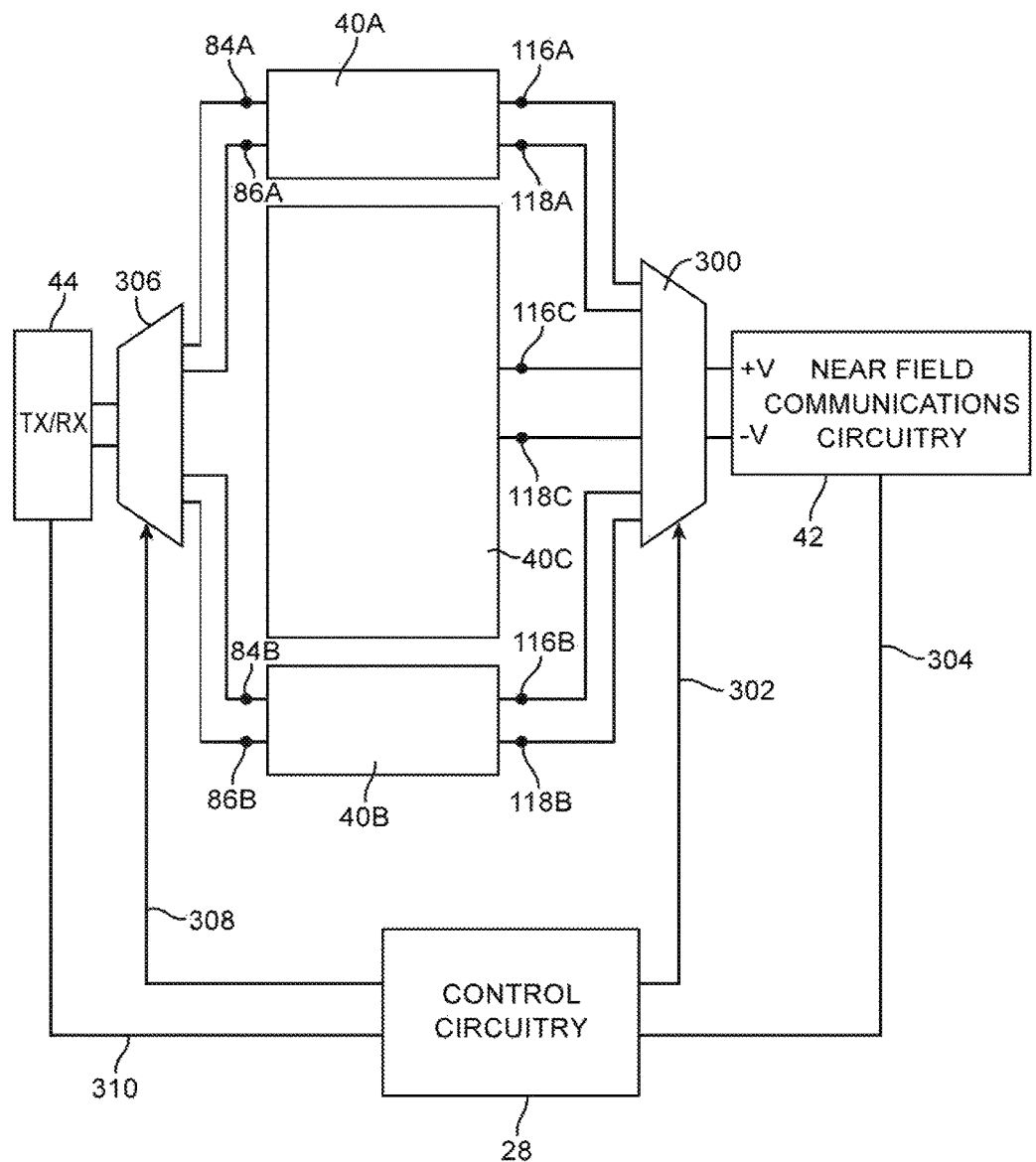
FIG. 7 is a diagram of an illustrative electronic device having multiplexed upper and lower non-near-field antennas and multiplexed upper, middle, and lower near-field antennas in accordance with an embodiment.

The near-field communications loop antenna in structures 40A, the near-field communications loop antenna in structures 40C, and the near-field communications loop antenna in structures 40B may form a set (e.g., an array) of three-antenna near-field communications antennas. As shown in FIG. 7, multiplexing circuitry 300 may be used to couple near-field communications circuitry to each of these three near-field communications antennas. In particular, multiplexing circuitry 300 may have a transceiver port that is coupled to differential signal terminals (+V) and (−V) in near-field communications circuitry 42 and may have three antenna ports that are coupled respectively to near-field communications terminals 116A and 118A for the near-field communications loop antenna in structures 40A, near-field communications terminals 116C and 118C for near-field communications loop antenna of structures 40C, and near-field communications terminals 116B and 118B for the near-field communications loop antenna in structures 40B. Path 304 may be used to convey near-field communications data between control circuitry 28 and near-field communications circuitry 42. Multiplexer circuitry 300 may be based on a passive signal combining circuit that couples circuitry 42 to the three near-field communications antennas of FIG. 7 in parallel or may be active switching circuitry that switches circuitry 42 to a selected one of the near-field communications antennas. With an active switching arrangement, control signals from control circuitry 28 (e.g., control signals that are conveyed to multiplexing circuitry 300 over path 302 from a baseband processor integrated circuit in control circuitry 28) may be used in controlling multiplexer 300 (e.g., to cycle through each of the near-field communications loop antennas in a predetermined sequence and/or to select a particular near-field communications loop antenna to switch into use based on sensor data, received signal strength information, or other real time information).

In addition to near-field communications antenna multiplexing circuitry such as multiplexing circuitry 300, device 10 may, if desired, include non-near-field communications antenna multiplexing circuitry such as multiplexing circuitry 306. Multiplexing circuitry 306 may be used to implement a non-near-field communications antenna diversity scheme in which an optimal antenna from a set (e.g., an array) of antennas is switched into use in real time based on sensor data, received signals strength information, or other real time information. As shown in FIG. 7, multiplexing circuitry 306 may be controlled by control signals from control circuitry 28 (e.g., a baseband processor) that are conveyed to multiplexing circuitry 306 from control circuitry 28 over path 308. Path 310 may be used to route non-near-field communications data between control circuitry 28 and non-near-field communications transceiver 44. Multiplexing circuitry 306 may have a transceiver port that is coupled to non-near-field communications transceiver 44 and may have a pair of non-near-field communications antenna ports coupled respectively to terminals 84A and 86A of the non-near-field communications antenna of structures 40A and terminals 84B and 86B of the non-near-field communications antenna of structures 40B. Configurations for device 10 that have more than three or fewer than three near-field communications loop antennas and/or that have more than two or fewer than two non-near-field communications antennas may also be used. The arrangement of FIG. 7 is merely illustrative.

Use of the multiple near-field antennas of FIG. 7 allows a user of device 10 to perform near-field communications operations while holding device 10 in numerous different orientations relative to antenna 62. Use of the multiple non-near-field antennas of FIG. 7 helps prevent the non-near-field antennas of device 10 from becoming blocked by the body of the user of device 10 or other external object.

Figure 8:
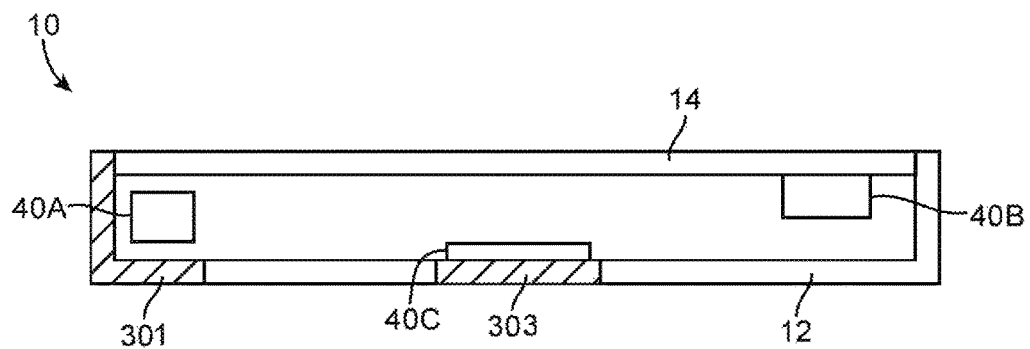
FIG. 8 is a cross-sectional side view of an illustrative electronic device such as a tablet computer with antenna structures in accordance with an embodiment.

If desired, device 10 may be a portable electronic device such as a tablet computer. FIG. 8 is a cross-sectional side view of an illustrative electronic device such as a tablet computer. As shown in FIG. 8, device 10 may have a display such as display 14 mounted on a front side of housing 12. Housing 12 may have a planar rear wall that forms an opposing rear side of housing 12. Housing 12 may be formed from a dielectric such as plastic or other suitable material. If desired, housing 12 may be formed from a metal such as aluminum. Dielectric windows may be formed in a metal housing. As shown in FIG. 8, for example, plastic antenna window 301 may be used to cover antenna structures 40A. Antenna structures 40A may include a satellite navigation antenna, one or more cellular telephone and wireless local area network antennas, and a near-field communications loop antenna and may operate through window 301 (as an example). Antenna structures 40C may be formed over dielectric window 303, so that antenna structures 40C may operate through window 303. Window 303 may be formed from plastic or other suitable material and may have the shape of a logo or other suitable shape (i.e., window 303 may be a logo-shaped antenna window). Antenna structures 40C may include a wireless local area network antenna and/or a near-field communications loop antenna (as an example). A near-field communications loop antenna and/or a non-near-field communications antenna may also be mounted under an inactive border portion of display 14 (see, e.g., antenna structures 40B) and may operate through the display. Display 14 may have a dielectric cover layer such as a glass cover layer. Antenna structures 40B (e.g., a near-field communications antenna) may operate through the glass cover layer. If desired, antenna windows such as antenna window 301 of FIG. 8 may also be formed at opposing ends of device housing 12. The configuration of FIG. 8 is merely illustrative.

The foregoing is merely illustrative and various modifications can be made by those skilled in the art without departing from the scope and spirit of the described embodiments. The foregoing embodiments may be implemented individually or in any combination.

What is claimed is:
1. An electronic device, comprising:
a first near-field communications loop antenna;
a second near-field communications loop antenna;
near-field communications circuitry that wirelessly communicates using the first and second near-field communications loop antennas;
an antenna ground; and
an inverted-F antenna resonating element, wherein the first near-field communications loop antenna includes a portion of the inverted-F antenna resonating element and a portion of the antenna ground.

2. The electronic device defined in claim 1 further comprising:
a first non-near-field communications antenna;
a second non-near-field communications antenna; and
non-near-field communications circuitry that wirelessly communicates using the first and second non-near-field communications antennas.

3. The electronic device defined in claim 2, wherein the first near-field communications loop antenna and the first non-near-field communications antenna are formed at least partly from the antenna ground.

4. The electronic device defined in claim 2 further comprising a third near-field communications loop antenna.

5. The electronic device defined in claim 4 wherein the non-near-field communications circuitry comprises a cellular telephone transceiver.

6. The electronic device defined in claim 1, further comprising:
an additional inverted-F antenna resonating element, wherein the second near-field communications loop antenna includes a portion of the additional inverted-F antenna resonating element.

7. An electronic device, comprising:
a first near-field communications loop antenna;
a second near-field communications loop antenna;
near-field communications circuitry that wirelessly communicates using the first and second near-field communications loop antennas
a first non-near-field communications antenna;
a second non-near-field communications antenna;
non-near-field communications circuitry that wirelessly communicates using the first and second non-near-field communications antennas;
an antenna ground for the first non-near-field communications antenna, wherein the first near-field communications loop antenna, the first non-near-field communications antenna, and the second near-field communications loop antenna and the second non-near-field communications antenna are formed at least partly from the antenna ground.

8. The electronic device defined in claim 7 further comprising:
a first inverted-F antenna resonating element; and
a second inverted-F antenna resonating element, wherein the first non-near-field communications antenna is formed from the first inverted-F antenna resonating element and the antenna ground, the second non-near-field communications antenna is formed from the second inverted-F antenna resonating element and the antenna ground, the first near-field communications loop antenna includes a portion of the first inverted-F antenna resonating element, and the second near-field communications loop antenna includes a portion of the second inverted-F antenna resonating element.

9. The electronic device defined in claim 8 further comprising a third near-field communications loop antenna located between the first and second near-field communications antennas.

10. The electronic device defined in claim 9 further comprising a display, wherein the display overlaps the third near-field communications loop antenna.

11. The electronic device defined in claim 10 further comprising:
control circuitry; and
multiplexer circuitry controlled by the control circuitry, wherein the multiplexer circuitry has a transceiver port coupled to the near-field communications circuitry, has a first antenna port coupled to the first near-field communications loop antenna, has a second antenna port coupled to the second near-field communications loop antenna, and has a third antenna port coupled to the third near-field communications loop antenna.

12. The electronic device defined in claim 11 further comprising additional multiplexer circuitry coupled between the non-near-field communications circuitry and the first and second non-near-field communications antennas.

13. The electronic device defined in claim 12 wherein the non-near-field communications circuitry comprises a cellular telephone transceiver.

14. An electronic device, comprising:
a first near-field communications loop antenna;
a second near-field communications loop antenna;
near-field communications circuitry that wirelessly communicates using the first and second near-field communications loop antennas; and
peripheral conductive electronic device housing structures that form part of the first and second near-field communications loop antennas.

15. The electronic device defined in claim 14, further comprising:
a first non-near-field communications antenna;
a second non-near-field communications antenna; and
non-near-field communications circuitry that wirelessly communicates using the first and second non-near-field communications antennas, wherein the peripheral conductive electronic device housing structures form part of the first and second non-near-field communications antennas.

16. Apparatus, comprising:
a first near-field communications loop antenna;
a second near-field communications loop antenna; and
near-field communications circuitry;
multiplexer circuitry, wherein the multiplexer circuitry has a first antenna port coupled to the first near-field communications loop antenna, has a second antenna port coupled to the second near-field communications loop antenna, and has a transceiver port coupled to the near-field communications circuitry, and wherein the near-field communications circuitry wirelessly communicates using the first and second near-field communications loop antennas;
a conductive structure that forms at least part of the first near-field communications loop antenna and that forms at least part of the second near-field communications loop antenna, wherein the conductive structure forms an antenna ground;
non-near-field communications circuitry;
a first antenna resonating element arm, wherein the first antenna resonating element arm and the antenna ground form a first non-near-field communications antenna; and
a second antenna resonating element arm, wherein the second antenna resonating element arm and the antenna ground form a second non-near-field communications antenna and the non-near-field communications circuitry wirelessly communicates using the first and second non-near-field communications antennas.

17. The apparatus defined in claim 16 wherein the first near-field communications loop antenna includes at least part of the first antenna resonating element arm.

18. The apparatus defined in claim 16 further comprising a third near-field communications loop antenna coupled to a third antenna port of the multiplexer circuitry.

19. The apparatus defined in claim 16 further comprising an electronic device housing having opposing first and second ends, wherein the first antenna resonating element arm comprises an inverted-F antenna resonating element arm at the first end and the second antenna resonating element arm comprises an inverted-F antenna resonating element arm at the second end.

20. The apparatus defined in claim 16 further comprising:
   a third near-field communications loop antenna;
   an electronic device housing;
   a first antenna window in the electronic device housing through which the first near field communications loop antenna operates;
   a second antenna window in the electronic device housing through which the second near-field communications loop antenna operates; and
   a display mounted in the electronic device housing and having a portion through which the third near-field communications loop antenna operates.

* * * * *